United States Patent Office 2,939,882
Patented June 7, 1960

2,939,882
STABILIZED ALPHA,BETA-UNSATURATED ALDEHYDES

John W. Mecorney, Lafayette, Calif., assignor to Shell Oil Company, a corporation of Delaware No Drawing. Filed July 21, 1958, Ser. No. 749,638

5 Claims. (Cl. 260—601)

This invention relates to the stabilization of alpha,beta-unsaturated aliphatic aldehydes, and relates more particularly to the stabilization of acrolein and methacrolein.

The alpha,beta-unsaturated aliphatic aldehydes, such as for example, acrolein, undergo autopolymerization with the formation of products of a gummy or resinous character. The rate at which these undesirable materials are formed is often of such magnitude as to present serious problems in the transportation, storage and/or processing of the unsaturated aldehydic compounds. The presence of the products of autopolymerization not only results in a depreciation of the value of the material contaminated therewith but represents a material loss of valuable unsaturated aldehydes. At least a substantial part of the resinous materials thus formed are generally insoluble in the aldehydes from which they are derived and in solvents, such as hydrocarbon solvents, often employed in the processing of the unsaturated aldehydes. When the insoluble polymeric products settle out of the aldehydic materials containing them, the plugging of lines, heat exchangers, distillation apparatus, storage vessels and the like, wherein the unsaturated aldehydes are found, often results.

Some suppression of the rate of autopolymerization is at times attainable by the use of certain of the stabilizing agents disclosed heretofore. However, most of the materials disclosed heretofore for this purpose have often been found to be unsuited for use on a practical scale. Comprised in the factors contributing to the inadequacy of these materials are, for example, relative insolubility in the unsaturated aldehydes or in mixtures comprising the aldehydes, and/or unfavorable distribution between phases in an extractive step.

In co-pending U.S. application Serial Number 630,056, filed December 24, 1956, now Patent No. 2,886,493, it is disclosed and claimed that substantially improved inhibition of autopolymerization of alpha,beta-unsaturated aldehydes is attained by the use of nitric oxide as stabilizing agent. The use of a normally gaseous material is, however, not always possible or equally desirable under every condition encountered in the transportation, storage and/or processing of the unsaturated aldehydes.

In co-pending application Serial Number 630,055, filed December 24, 1956, now Patent No. 2,874,099, of which the present application is a continuation-in-part, there is disclosed, and claimed, the stabilization of alpha,beta-unsaturated aliphatic aldehydes by the incorporation therewith of a salt of nitrous acid with an organic nitrogen base, such as the dialkyl ammonium nitrites represented by the general formula:

(I)

wherein each R is the same or a different alkyl or cycloalkyl group.

It has now been found that substantial improvement in the stabilization of the alpha,beta-unsaturated aliphatic aldehydes, such as acrolein and methacrolein, is attained by incorporating therein a stabilizing amount of an oxime.

Oximes employed as stabilizing agents for alpha,beta-unsaturated aliphatic aldehydes in accordance with the present invention, as a class, possess a signal advantage over the dialkyl nitrite type of stabilizers in that they comprise members possessing relatively low melting points and which are liquid at relatively low temperature and pressure conditions. Their solubility characteristics furthermore enable their efficient use in the presence of certain solvents, and under conditions of operation and storage, at which other additives are often prone to undergo substantial separation by precipitation.

Oximes employed as stabilizing agents for alpha,beta-unsaturated aliphatic aldehydes in accordance with the present invention comprise compounds possessing the oximino group =N—OH, represented by the general formula:

(II)

wherein R is a hydrocarbyl group, and R' is a member of the group consisting of hydrogen and hydrocarbyl groups. When R or R' are hydrocarbyl they may be, for example, alkyl, aryl, alkaryl or aralkyl. Suitable oximes comprise broadly the aldoximes and ketoximes of syn- or anti- configuration. Examples of the suitable oximes are: the ketoximes such as acetoxime, diisopropyl oxime, cyclohexanone oxime, and the like; the aldoximes such as ethanal oxime, propanal oxime, heptanal oxime, propenal oxime, benzaloxime, di-n-heptyl oxime, di-n-octyl oxime, di-n-undecyl oxime, di-n-heptadecyl oxime, etc. It is to be stressed that the compounds comprised in the broad class of oxime stabilizing agents represented by the foregoing Formula II are not necessarily equivalent in effectiveness for the purpose of the present invention. Alkyl and dialkyl oximes, wherein the alkyl groups have from one to six carbon atoms, are generally preferred. Of these compounds the use of the dialkyl oximes is particularly preferred.

Because of its solubility characteristics with respect to hydrocarbon solvents as well as its outstanding effectiveness in suppressing autopolymerization, acetoxime is particularly preferred as a stabilizing agent for acrolein.

The invention is applied broadly to the stabilization during storage, transportation and/or processing, at ordinary and/or elevated temperatures, of the alpha,beta-unsaturated aliphatic aldehydes such as, for example, acrolein, methacrolein, etc., regardless of their source or origin. Comprised within the alpha,beta-unsaturated aliphatic aldehydes thus stabilized within the scope of the invention are the homologs of acrolein comprising those wherein at least one of the hydrogen atoms attached to the alpha or beta carbon atom of acrolein is replaced by and alkyl group such as, for example, methyl, ethyl, propyl, butyl, amyl, etc. The invention is of particular value in the stabilization of the crude aliphatic aldehydes as obtained, for example, by controlled catalytic oxidation of corresponding olefinic hydrocarbons. Comprised within the aldehydes stabilized in accordance with the invention are aqueous solutions of the crude aldehydes obtained, for example, by the adsorption of olefin oxidation products comprising the unsaturated aldehydes with aqueous solvents.

Processing conducted at elevated temperatures during the course of which the aliphatic aldehydes are stabilized in accordance with the invention, comprise any of the steps to which the aldehydes, in crude or refined state, aqueous solutions thereof, mixtures comprising them, etc. are normally subjected during the processing or treating thereof. Such processing may comprise one or more such steps, as for example, distillation, solvent extraction, extractive distillation, heat exchange, condensation, heating, stratification, filtering, etc.

The invention is not limited to any specific method of introducing the stabilizer into the aliphatic alpha,beta-unsaturated aldehyde to be stabilized. The stabilizer, or a suitable solution or suspension thereof, may be added to the aldehyde with the latter is in the liquid phase at ordinary or elevated temperatures. The stabilizer may be added to the aldehyde before, during, or after a processing or treating thereof. The stabilizer introduced into equipment or vessels wherein the aliphatic aldehyde to be stabilized is contained, may be injected into one or more parts thereof. In a preferred method of incorporating the stabilizer into an unsaturated aldehyde, such as, for example, acrolein, it is introduced prior to formation of precursors of the autopolymerization products. This is generally accomplished by adding the stabilizer to the crude aldehyde, or by introducing it into the equipment wherein such crude acrolein is to be processed or treated. Without intent to limit in any wise the scope of the present invention by theory advanced herein to set forth more fully the nature of the invention, it is believed that precursors leading to subsequent formation of resinous materials during storage may well be formed during the processing of the unsaturated aliphatic aldehyde at elevated temperatures.

The quality of the oxime stabilizer added to the aliphatic aldehyde to accomplish the desired degree of stabilization may vary within the scope of the invention. In general the stabilizer is employed in an amount ranging, for example, from about 0.01 to about 1.0% wt. In general, an amount of from about .05 to about 0.10% wt., based upon aliphatic aldehyde, will be found satisfactory. Greater or lesser amounts of the stabilizer may, however, be employed within the scope of the invention. During the processing of acrolein in continuous systems the continuous or intermittent, introduction of the stabilizer into one or more parts of the system may be resorted to within the scope of the invention.

The effectiveness of the oximes in stabilizing the alpha,beta-unsaturated aliphatic aldehydes during conditions of transportation and/or storage is illustrated by the following example. The ability of the dialkyl ammonium nitrites above referred to, and of the oximes of the present invention, to stabilize to such a marked degree the alpha,beta-unsaturated aliphatic aldehydes is not possessed by the nitrogen compounds broadly, or by compounds heretofore disclosed as stabilizing agents for unsaturated aldehydes as evidenced by results shown in Table B of the following example.

EXAMPLE

Two samples of acrolein, obtained by catalytic oxidation of propylene, purified by flash distillation and dried over anhydrous calcium sulfate, were placed in glass containers, identified by the designations "A" and "B," respectively. To the acrolein in container "A" nothing was added; to that in container "B" there was added acetoxime in an amount equal to 0.1% by weight of the acrolein. The containers were then sealed and stored at room temperature. The time elapsed from initiating the storage to the time of initial clouding was recorded for each sample. Results obtained are set forth in the following Table A.

Table A

| Sample: | Cloud time |
|---|---|
| A | 2 hrs. |
| B | 9 days |

In the following Table B, the "Cloud Time," that is, the time from initiation of storage to initial cloud formation at room temperature, is given for eight separate samples of acrolein, each containing a different additive. The additive was present in an amount equal to 0.1% by weight of the acrolein.

Table B

| Acrolein, Sample No. | Additive | Cloud Time |
|---|---|---|
| 1 | Hydroquinone | >2 days. |
| 2 | p-Aminoazobenzene | 6 hrs. |
| 3 | N,N'-di-sec.butyl-p-phenylenediamine | 6 hrs. |
| 4 | α-Naphthylthiourea | 6 hrs. |
| 5 | Hydrazine hydrate | 45 hrs. |
| 6 | m-Nitrosodiphenylamine | 18 hrs. |
| 7 | Nitrobenzene | 1.5 hrs. |
| 8 | n-Butyl nitrite | 0.67 hr. |

In a storage test three samples of the acrolein (Samples "I," "II" and "III") were stored for a period of eight days in sealed, half-filled, glass containers at room temperature. To Sample "I" no additive was added. To Sample "II" there was added 0.1% by weight of acetoxime; and to Sample "III" there was added 0.1% by weight of hydroquinone. Appearance of the samples after the eight-day storage period was recorded and is set forth in the following Table C:

Table C

| Sample: | Appearance after 8-day storage |
|---|---|
| I | Laden completely with a dense flocculent precipitate. |
| II | Slight cloudiness. |
| III | Complete discoloration (dark yellow). |

Comprised within the scope of the invention is the use of the oxime stabilizers in combination with other agents capable of suppressing to some extent the formation of gums, or other resinous materials, in the alpha,beta-unsaturated aldehyde during transportation, storage and/or processing thereof. Such additional agents which may be employed in combination with the nitrite stabilizers comprise, for example, nitric oxide; phenolic types of anti-oxidents such as hydroquinone, 2,6-di-tert. butyl-4-methyl phenol; a nitrite salt of a secondary amine; etc. A suitable combination of additives, effective in the processing of unsaturated aliphatic aldehydes at elevated temperatures, is the combination of one or more of the oxime additives with nitric oxide.

The invention claimed is:

1. The method of stabilizing an unsaturated aldehyde selected from the group consisting of acrolein and methacrolein, which comprises incorporating in said unsaturated aldehyde an oxime stabilizer of the general formula

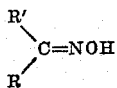

wherein R represents alkyl having from 1 to 6 carbon atoms and R' is selected from the group consisting of hydrogen and alkyl having from 1 to 6 carbon atoms.

2. The method in accordance with claim 1 wherein said oxime is a ketoxime.

3. The method in accordance with claim 2 wherein said ketoxime is present in an amount ranging from about 0.01 to about 1.0% by weight.

4. The method of stabilizing acrolein which comprises incorporating therewith from about 0.01 to about 1.0% by weight of acetoxime.

5. A composition of matter consisting essentially of acrolein containing from about 0.01 to about 1.0% by weight of acetoxime.

References Cited in the file of this patent

UNITED STATES PATENTS

| 2,462,678 | Roedel | Feb. 22, 1949 |
| 2,683,140 | Howard | July 6, 1954 |